(12) United States Patent
König et al.

(10) Patent No.: US 7,252,111 B2
(45) Date of Patent: Aug. 7, 2007

(54) TRANSPORT OF HIGHLY VISCOUS FLUIDS IN CLOSED PIPELINE SYSTEMS

(75) Inventors: Sven König, Hamburg (DE); Hermann Neuhaus-Steinmetz, Ahrensburg (DE); Ulrich Reiser, Hohenlockstedt (DE); Norbert Grittner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 100 days.

(21) Appl. No.: 10/477,657

(22) PCT Filed: May 17, 2001

(86) PCT No.: PCT/EP01/05655

§ 371 (c)(1),
(2), (4) Date: May 13, 2004

(87) PCT Pub. No.: WO02/092310

PCT Pub. Date: Nov. 21, 2002

(65) Prior Publication Data

US 2004/0232161 A1 Nov. 25, 2004

(51) Int. Cl.
*B67D 5/52* (2006.01)
(52) U.S. Cl. ................. 137/565.29; 137/571; 222/386; 222/389; 425/143
(58) Field of Classification Search ........... 137/565.29, 137/571; 222/256, 262, 386, 387, 389, 327, 222/326, 145.5, 56, 135; 425/558, 561, 547, 425/143
See application file for complete search history.

(56) References Cited

U.S. PATENT DOCUMENTS

| | | | | |
|---|---|---|---|---|
| 3,786,966 A | * | 1/1974 | Behunin et al. | 222/387 |
| 3,964,645 A | * | 6/1976 | Scholl | 222/146.5 |
| 4,059,714 A | * | 11/1977 | Scholl et al. | 428/317.5 |
| 4,397,630 A | * | 8/1983 | Meeker | 425/582 |
| 4,474,311 A | * | 10/1984 | Petrecca | 222/146.5 |
| 4,479,590 A | * | 10/1984 | Slautterback | 222/146.5 |
| 4,586,636 A | | 5/1986 | Bauer et al. | 222/146.5 |
| 4,630,382 A | | 12/1986 | Keiler et al. | 34/173 |
| 4,824,355 A | * | 4/1989 | Lenhardt | 425/378.1 |
| 4,834,545 A | * | 5/1989 | Inoue et al. | 366/138 |
| 5,161,714 A | | 11/1992 | Neumann et al. | 222/55 |
| 6,045,740 A | * | 4/2000 | Gorlich | 264/297.2 |

FOREIGN PATENT DOCUMENTS

DE  36 25 358 A1  2/1988

* cited by examiner

*Primary Examiner*—Eric Keasel
*Assistant Examiner*—Craig Price
(74) *Attorney, Agent, or Firm*—Norris, McLaughlin & Marcus (57) ABSTRACT

Apparatus far equilibrating differences between flow rates into and out of closed pipeline systems, which apparatus includes a tank having a supply line and a discharge unit, with a displaceable plate; the supply being fed to the tank through the displaceable plate, the discharge from the tank being through an outlet at the bottom of the tank and the plate moving upwards or downwards to automatically change the volume of the tank in accordance with differences between the supply rate and the discharge rate.

12 Claims, 4 Drawing Sheets

TRANSPORT OF HIGHLY VISCOUS FLUIDS IN CLOSED PIPELINE SYSTEMS

This is a 371 of PCT/EP01/05665 filed 17 May 2001 (international filing date).

The invention relates to an apparatus for the equilibration of the throughput of, in particular, highly viscous fluids in closed pipeline systems and to methods for the product-conserving intermediate storage of, in particular, temperature-sensitive highly viscous fluids in closed pipeline systems.

BACKGROUND OF THE INVENTION

Within major production facilities, highly viscous fluids, such as for example polymer melts, polymer solutions or food preparations, are generally transported in closed pipeline systems. With the delivery pressures usually occurring, these fluids are to be regarded as incompressible. At the same time, the pipeline systems are themselves constructed with a constant volume, to be able to withstand the delivery pressure and to allow exact control of the volume flow delivered.

Therefore, the throughput of the highly viscous fluid only changes along a closed pipeline system when additional materials are fed into the pipeline system or material is discharged from the pipeline system.

The former can be achieved by units which build up pressure, such as for example extruders or pumps, the latter by valves, drain cocks or processing tools, such as for example nozzles or injection molds. The type of units and valves used and how they are interconnected to form process engineering installations is very varied.

Therefore, such an installation is described below by taking the example of processing hot-melt adhesives.

At the beginning of the process, the adhesive composition to be processed is produced from raw materials and intermediate products in accordance with its formulation. Used for example for this are mixing tanks with special mixing units or kneading machines, compounding extruders and numerous further types of machine. If a ready-made adhesive composition is used, it must be melted in a conserving and uniform manner. This takes place for example in so-called tank melting devices, in drum melting installations, in roller melting devices or in melt extruders. From these devices, the finished hot-melt adhesive is fed into a pipeline or a pressure-resistant hoseline by a pump or under the unit's own pressure. Permanently installed in this pipeline are usually a number of shut-off valves, measuring points for pressure and temperature, melt filters and much more besides. If changing hot-melt adhesives or very large amounts are being processed, for the adhesive compositions there are often a number of production lines, which are connected to one another by means of corresponding pipe switches and shut-off valves.

The melt passes through this pipeline system directly into one or more application systems. Part of these application systems is in most cases a dedicated pressure-building element, such as for example a gear pump, a piston metering device or a conveying screw. In some cases, these pressure-building elements are dependent on a constant minimal admission pressure for them to be operational. This is often the case for example with gear pumps. Systems for applying the molten adhesive composition to a carrier material may be, for example, continuously operating nozzles, for instance for full-area coating or for strip coating, for bead application or for vortex spraying. Equally, intermittent application methods are used, in which the adhesive stream is interrupted in predetermined cycles or if need be manually, such as for example in the fully automatic gluing of cardboard packs or in manual application by means of an adhesive gun. Only in very rare cases can it be assumed that the production and processing of the hot-melt adhesives takes place with exactly the same throughputs. Even in these ideal cases, it must be taken into account that even small differences in throughput or pulsations cause considerable pressure fluctuations in the completely filled pipeline systems if elements with inflexible delivery, such as for example melt pumps or extruders, are used as the delivery means.

Fluctuating admission pressures, however, considerably impair for example the constancy of the application of the composition in the case of full-area nozzle coating. Therefore, sophisticated control loops are required to protect the installation and to ensure a high product quality and a stable process.

Much more frequently, discontinuous production of hot-melt adhesives is combined with continuous processing. Encountered more rarely are combinations of continuous production and discontinuous processing. In both cases, an equalization of the different throughputs must be provided by the machinery or equipment used.

Furthermore, when the production and processing of hot-melt adhesives are combined, short-term failure of one of the parts of the installation also leads to the immediate failure of the other, still operational part of the installation, due to the completely filled pipeline system, since either the adhesive composition cannot be accepted or no adhesive composition is available.

In all the cases outlined here, the situation can be remedied by the use of units which are not inflexible in their delivery, or by correspondingly designed equalizing volumes. Such equalizing volumes may be buffer tanks or pulsation dampers.

The use of units which are not inflexible in their delivery, such as for example pneumatic piston pumps or gear pumps with low volumetric efficiencies, leads during operation to throughput-dependent mechanical and thermal loads on the hot-melt adhesives to be delivered. Furthermore, piston pumps have a highly pulsating delivery characteristic, which makes them unsuitable for continuous application methods. The use of conventional buffer tanks is restricted to fluids of comparatively low viscosity, since otherwise complete emptying under the effect of gravity is not ensured. Even sophisticated agitating elements or wall strippers cannot ensure in the case of tacky and viscous substances that residual material can be removed during emptying. Moreover, in continuous operation, back-mixing with the material already present in the buffer tank always occurs, which has the consequence that residence times vary widely and consequently thermally sensitive hot-melt adhesives are exposed to uncontrolled aging processes.

One particular special design of the buffer tank in connection with a gear pump is that of the gear-in-die (GID) principle. A slot die is in this case preceded by a gear pump which is constructed in the full coating width and draws the fluid to be coated from a similarly wide storage tank. The latter is of a rectangular construction, only partially filled and, if appropriate, subjected to compressed air. This gives rise to considerable disadvantages, in that, when highly viscous fluids are used, the fluid exchange in continuous operation and the emptying of residual material is possible only very incompletely on account of adhesion to the walls. At the same time, thermal-oxidative aging or even decomposition of sensitive fluids can easily occur over the surface of the fluid exposed to the air.

Pulsation dampers are customary instruments for equalizing pressure fluctuations in pipeline systems. However, in the case of incompressible fluids only very small equalizing volumes are required for this purpose, so that the available devices are not suitable for the equalization of relatively great differences in volume. They also have the disadvantage in principle that the material last received is the last discharged again, which can also have the consequence here of long residence times, and consequently unfavorable aging behaviour of heat-sensitive hot-melt adhesives.

The same disadvantage is encountered in the case of so-called buffer presses. Here, a movable, cylindrical tank is hydraulically pressed against a fixed plate which is fitted exactly into the cylinder and in which the inflow and outflow openings are located. Here, too, the fluid enters and leaves on the same side of the tank. As a result of the cylindrical construction, with a small length/diameter ratio and with an axially arranged inflow and outflows this type of apparatus has wide ranges with only very inadequate fluid exchange, which lead to the partial averaging of thermally sensitive or perishable fluids. With the same volume flows in the outflow and inflow, finally no exchange at all of the tank contents takes place. The mobility of the entire tank also makes sophisticated statics of the apparatus absolutely essential, in particular if the high discharge pressures of up to 30 bar are taken into account. Since a hydraulic transmission of the slender hydraulic cylinders to the large tank cross section is involved here in principle, such high pipeline pressures can only be achieved in the outflow with enormous hydraulic installations.

There are pressure accumulators for the equilibration of a fluid stream which are capable in continuous operation of equalizing both pressure and throughput fluctuations in a closed pipeline system and at the same time building up constant high processing pressures. The operating mode of the storage tank is based on the idea that the tank provides a certain volume of product and a certain free volume. This is available for the case in which the fluid-delivering or fluid-receiving side of the process fails.

The discharge of the fluid from the storage tank with a delivery element is assisted and kept constant by pressure build-up, for example by means of a pneumatically driven movable ram. A pressure peak caused by the fluid-delivering side of the process, caused by the volume deviating from the setpoint volume flow, is counterbalanced by the ram plate which is connected to the pneumatics releasing the difference in volume as tank volume. The admission pressure of the delivery element connected directly to the storage tank changes only to a negligible extent as a result, depending on the inertia of the system. The inertia of the system is dependent for example on the frictional moment of the ram seals and the volume of the pneumatic rams. Here it is advisable to use pneumatic rams which are of as large a volume as possible or equipped with a pressure-relief valve. This prevents compression of the gas in the pneumatic rams from taking place. The compression would cause a reaction on the ram plate which brings about an increase or decrease in the pressure in the storage tank and consequently in the admission pressure of the delivery element.

The ram is sealed with respect to the storage tank by suitable seals against escape of the fluid via the ram plate. These apparatuses, mostly derived from drum melting technology, exist in various configurations, which essentially differ by the arrangement of the points for feeding in and discharging the product.

It is known for the fluid to be fed in and discharged in the bottom region. The problems which occur in the case of this solution are analogous to those of the buffer press.

The object of the invention is to overcome the shortcomings of the technologies derived from the prior art for the equilibration of a temperature-sensitive highly viscous fluid stream by an apparatus which is capable in continuous operation of equalizing pressure and throughput fluctuations in a closed pipeline system, of ensuring a narrow range of controllable residence times, of storing large amounts of fluid and of building up constant high processing pressures.

Furthermore, the system is intended to have the following further properties:

It is to be largely free of any dead space, to avoid the aging of, in particular, temperature-sensitive fluids.

It is to be of a simple structural design for cleaning purposes and show a cost saving and also a high level of reliability to increase the overall efficiency of the installation.

Application of the method is not restricted to highly viscous temperature-sensitive fluids, that is to say its use for fluids of low viscosity is not ruled out but equally possible.

This object is achieved by an apparatus such as that presented in the main claim. The subclaims describe advantageous developments of the subject-matter of the invention and also methods for the conserving intermediate storage of, in particular, temperature-sensitive highly viscous fluids in closed pipeline systems.

SUMMARY OF THE INVENTION

The invention accordingly relates to an apparatus for the equilibration of the throughput of, in particular, highly viscous fluids in closed pipeline systems, comprising a preferably movable supply line, a tank, a plate which is displaceable in the tank and a discharge unit, the fluids being fed to the tank through the supply line.

The tank is closed at the inflow opening by a displaceable plate, which is sealed against the inside walls of the tank and bears the supply line, and at the outflow opening by a base and a delivery unit attached thereto, closed in such a way that the volume changes automatically as a result of the difference in the throughputs at the inflow and outflow and the resultant displacement of the plate.

This is accompanied by the units on the inflow side and outflow side being decoupled from each other with respect to throughput and pressure, with largely constant internal pressure.

DETAILED DESCRIPTION

In a preferred embodiment, the tank is tubular, in particular with a circular cross section, and/or longitudinally profiled and/or double-walled.

In a further preferred embodiment, the tank is lined on the inside with an anti-adhesive layer and/or an anti-corrosive layer.

The inner sides of the plate and of the base preferably have a complementary, in particular conical, profile, so that the tank volume in the lower end position of the plate is virtually zero.

Furthermore, the plate is preferably designed such that the fluid is evenly distributed over the entire cross section of the tank.

The fluid is advantageously distributed within the plate by a star-shaped distributing channel to the outer edge of the plate in such a way that it leaves into the tank evenly over the entire periphery of the plate.

To ensure adequate viscosity of the fluid, all the parts of the tank with which the fluid comes into contact may be thermostatically controlled to the inflow temperature of the fluid, the thermostatic control preferably taking place electrically, preferably by heating conductors, or inductively, by thermal fluids such as water or thermal oil and/or by steam.

In a further preferred embodiment, the plate is pressed against the surface of the fluid by a preferably constant force which is independent of the position of the plate, the force being generated in particular by pneumatic cylinders, by hydraulic cylinders and/or by a weight. In a further embodiment, the tank will generate the force by a pressure via the ram plate, to be precise by gas, the ram plate being provided with seals for sealing against the gas space.

In a further preferred embodiment, the tank volume is completely filled by the fluid.

The internal pressure of the tank at inflow point is preferably determined only by the own weight of the plate, of the parts of the installation exerting a load on the plate and the pressing force of the plate.

The degree of filling of the tank, and consequently the position of the plate, may be independent of the internal pressure of the tank at the inflow point; similarly, the internal pressure of the tank at the inflow point may be independent of the filling level.

In a further preferred embodiment, the discharge unit is an extruder, a pump, a gear pump, in particular a polymer discharge pump, or a shut-off element.

The tank may be operated in such an operating mode that the inflow is located at the bottom of the tank and the outflow takes place through the plate.

Furthermore, it is advantageous if the discharge unit is mounted on the plate or at the free end of the movable supply and discharge line.

It is particularly advantageous if the position of the movable plate, and consequently the volume enclosed in the tank, can be measured by means of a displacement transducer and if the change in the measured volume can be used for controlling the connected fluid-delivering and fluid-consuming units.

The feeding of the melt into the tank from above through a ram vertically following the filling level in the tank and discharged in the bottom region of the tank represents a method in which a more optimum range of residence times is achieved by the so-called first-in-first-out principle being applied. The fluid entering first is also the first to leave the storage tank and, as a result, has a more defined residence time than in the case of the functional principle with feeding-in taking place in the bottom region.

In principle, the storage tank takes the form of a pipeline with a large diameter and variable length. It is evident from theory ("Praktische Rheologie der Kunststoffe und Elastomere" [Practical rheology of plastics and elastomers] by Pahl, M.; Gleißle W.: Laun, H. M.; VDI-Gesellschaft Kunststofftechnik [Plastics engineering society of the Association of German Engineers], Dusseldorf: VDI-Verl., 1991) and from practice that the range of residence times of fluids is distributed over the pipe cross section. In the case of an intrinsically viscous fluid, such as for example a polymer melt, with an Ostwald/de-Waele coefficient of 0.5, after the average residence time of $$t = \frac{\text{pipeline length} \times \text{pipeline surface area}}{\text{total volume flow}},$$

75.7% of the fluid has left the pipeline. Only after 10.2 times the average residence time has 99.8% left the pipeline.

The tank flowed through on the basis of the first-in-first-out principle behaves in an analogous way. This residence time enhances the aging of, in particular, temperature-sensitive fluids, in particular in the heated tank.

The invention is to be described in more detail below by means of several figures, in which.

BRIEF DESCRIPTION OF THE DRAWINGS

Figure 1:
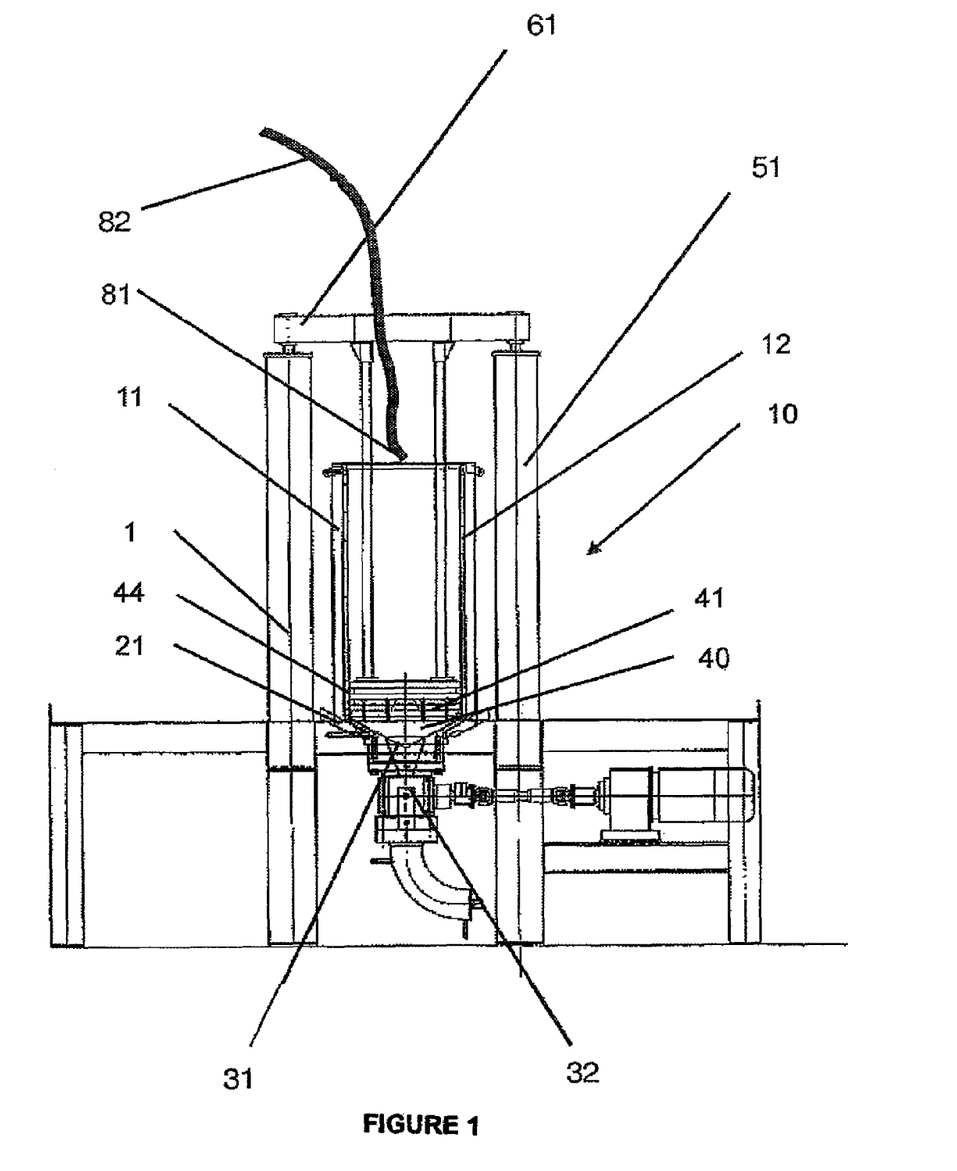
FIG. 1 shows a vertical section through the apparatus with the tank, base, plate together with plate guide and discharge unit in a supporting framework.

FIG. 1 shows the cylindrical tank 11, which is suspended in a framework 1 surrounding it. The tank 11 is set up vertically. The vertical arrangement is preferred, but other installation positions are similarly possible.

Firmly connected to the tank 11 is the base 21. The displaceable plate 40 is located in the tank 11, but can be lifted out by means of the pneumatic cylinders 51 for servicing work. The tank 11 and the base 21 are constructed completely in a double-walled configuration 12, to permit thermostatic control throughout.

The bottom of the cylinder 11 is formed by the base 21, preferably a downwardly tapering cone, in the center of which the outflow opening 31 is located.

The cylinder 11 is closed in the upward direction by a heatable, displaceable plate 40, which can be sealed against the inside wall of the tank. The plate 40 is guided parallel to the cylinder axis by an external guide, for example two pneumatic cylinders 51 with a yoke 61 and holding rods 71. In the center of the plate 40 is the inflow opening 81.

The fluid stream to be buffered is fed to the plate 40 through a movable supply line, for example a flexible, heated hose 82.

Figure 2:
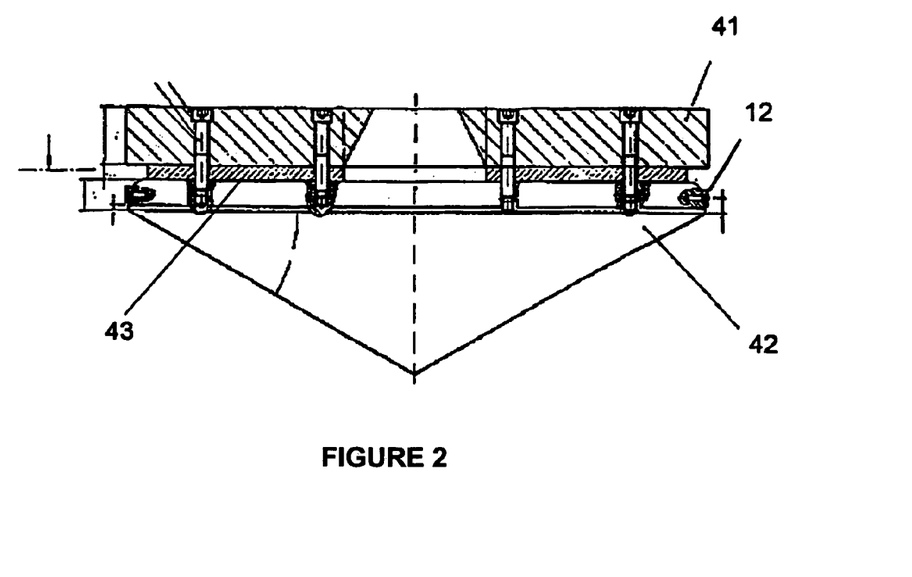
FIG. 2 shows a vertical section through the displaceable plate and FIG. 3 shows the plan view of the distributing channel of the displaceable plate.
Figure 3:
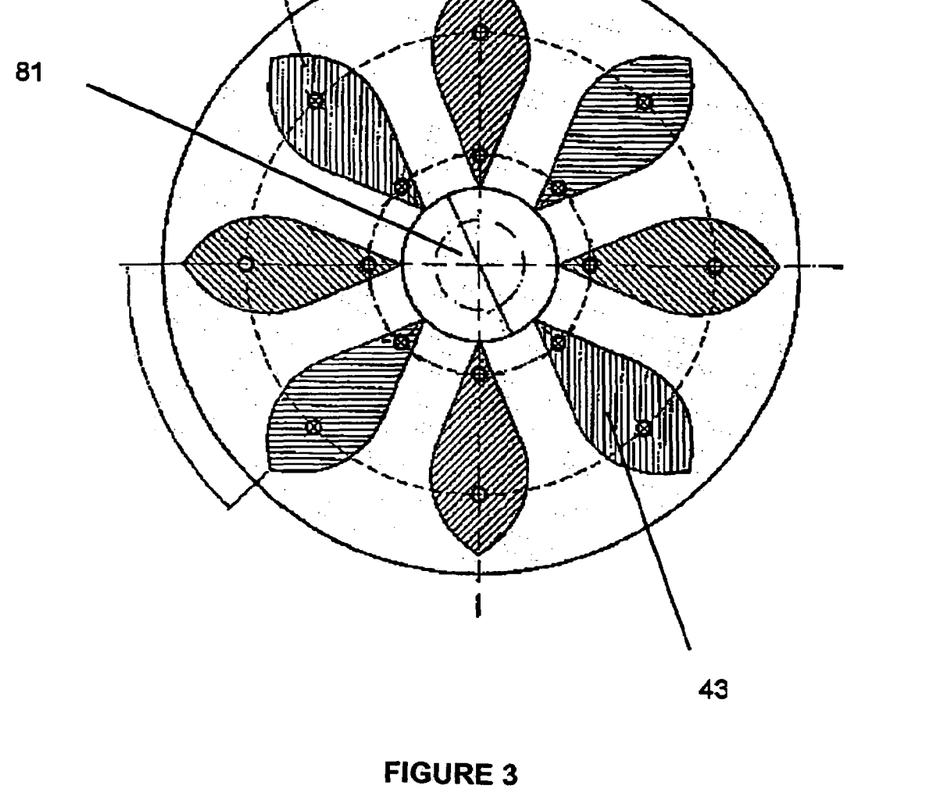

FIG. 2 illustrates the displaceable plate. The plate 40 substantially comprises the upper part 41 and the lower part 42 and is structurally designed in such a way that the fluid stream is distributed radially symmetrically into the annular gap between the plate 40 and the cylinder 11 by the distributing elements 43 clamped between the upper part 41, and the lower part 42. The annular gap is referred to hereafter as the inflow point. The two plate parts 41 and 42 are connected to each other in such a way that the electrical heating integrated into the upper part 41 also heats the lower part 42 via the contact areas of the distributing elements 43. The centering of the plate 40 in the tank 11 takes place by the sealing rings 44, which are under compressive stress, and if appropriate additionally by the cams 12.

The lower part 42 of the plate is formed such that it tapers downward and complements the tank base 21, in order to ensure even flushing-through of the tank 10 without any dead spaces and complete emptying of residual material.

By means of a corresponding control device, the pneumatic cylinders 51 produce on the displaceable plate 40 a pressure which can be set but is constant. Together with the design-dependent own weight of the displaceable plate 40, of its guide comprising the yoke 61 and the holding rods 71 and of the supply line fastened to the plate, this pressure exerts a load on the contents of the tank and consequently, produces a constant internal tank pressure. This constant internal pressure is of great advantage for the continuous removal of the fluid to be buffered.

This takes place through the outflow opening 31, to which a large-mouthed pump 32 is flange-mounted. This pump 32 is preferably a gear pump or, in a particularly suitable special design, a polymer discharge pump, which, as a result of a special inflow geometry, can discharge highly viscous fluid even from high, vacuum and can build up differential pressures of up to 250 bar.

The heating of the pump 32, like all other heating systems, is preferably configured as an oil trace heating system, to ensure the most even possible temperature control without cold spots or overheating. Other liquid heat transfer media or steam are similarly possible.

The filling level of the tank 10 is measured, for example, by means of an analog displacement transducer and used for controlling the overall installation.

According to the invention, a highly viscous fluid is delivered into the container 10 through a flexible line 82 and the plate 40 with the throughput A. The internal pressure of the tank 10 at the outflow opening 31 is determined by the contact pressure of the pneumatic cylinders 51 and the own weight of the plate 40, of the attached parts 71 and 61 exerting a load on the latter and of the supply line 82, and the hydrostatic pressure of the fluid. As a result of the special geometry, the fluid flows through the tank 10 simultaneously from the outside to the inside and from top to bottom. This ensures that the exchange of the fluid takes place completely, free from dead spaces and with a narrow range of residence times.

The fluid flows continuously to the pump 32 under the internal pressure of the tank 10 through the outflow opening 31. The pump 32 delivers the fluid for further processing with a throughput B.

When there are differences between the throughputs A and B the filling level, measured by the displacement transducer, slowly rises (A>B) or slowly falls (A<B). As a result, the throughputs of the fluid-delivering and fluid-consuming parts of the installation are effectively and advantageously decoupled. Since, however, the internal pressure is influenced only little as a result (the hydrodynamic pressure at $p=1000$ kg/m$^3$ contributes only about 100 mbar per meter of filling level), the admission pressure of the pump 32, and consequently its delivery behavior, remains largely constant. This constant admission pressure, which is particularly desirable in the case of gear pumps, has very advantageous effects on the constancy of the delivery pressure, and consequently the product quality. Furthermore, corrective intervention into the throughput control of the fluid-delivering and fluid-consuming parts of the installation can be automatically carried out by means of the filling level picked off at the displacement transducer and its computationally determinable change, and consequently automatic throughput matching can be performed. With equal throughputs A and B, the filling level remains constant, but even in this case the contents of the tank are continuously exchanged, so that averaging of the fluid in the tank is effectively avoided.

In the event of failure of the fluid-delivering parts of the installation (A=0), the fluid-consuming part of the installation can continue to be fed from the tank volume for a certain time, determined by the tank volume and the outflow volume flow, or, conversely, in the event of failure of the fluid-consuming part of the installation (B=0), the fluid-delivering part of the installation can continue to be operated for a certain time, determined by the filling level, the maximum tank volume and the inflow volume flow. Consequently, the effectiveness of such an overall installation can be advantageously increased considerably, in that there is no longer any need for, running-down and running-up procedures for the parts of the installation not directly affected by short-term faults.

The volume of the tank 10 is dimensioned such that, when differences in throughput (/A-B/) briefly occur, sufficient time remains for corrective intervention in the process. Nevertheless, if the volume enclosed between the plate 40 and the tank base 21 reaches the maximum or minimum value, the fluid-delivering or fluid-consuming part of the installation is automatically switched off by means of a logic stored in the process control system.

The temperature control of the parts of the apparatus has the sole function of keeping the temperature of the fluid, and consequently its flow properties, constant. Temperature changes are envisaged only in running-up and running-down operation.

Furthermore, the invention comprises methods for the conserving intermediate storage of, in particular, temperature-sensitive highly viscous fluids in closed pipeline systems.

In the tanks according to the invention there are movable rams, which require flexible delivery lines. These are usually provided in the form of hoses.

The use of hoselines gives rise to the following restrictions:

When processing polymer melts in particular, heated pipelines or hoselines are used. Heated hoses, as are used for the delivery of polymer melts, must withstand high pressures. Hoselines for high pressures (200 bar and more) can only be produced with cross sections of up to at most about 40 mm. This limits the throughput of a storage system or requires a number of hoses operated in parallel. Hoses also have the disadvantage that they are poor for cleaning. Difficult fluids, which for example have a tendency to degrade or are very adhesive and, after aging, are soluble only with difficulty in solvent, are preferably removed by burning out the contaminated components. With hoses, which mostly consist primarily of organic plastics, this cannot be carried out.

One of the aspects of the functional principle of a storage tank with a movable ram plate is that failures of the fluid-delivering process and fluid-receiving process caused by faults are overcome for a time, dependent on the volume of the storage tank, by the content of the storage tank or the empty volume of the storage tank. This operating mode implies that, when the process is unaffected by faults, the ram has a virtually constant position. In the event of a fault of the fluid-receiving process, which occur for example in the case of charging operations, the storage tank is filled and moved back into position after the fault. It is possible that, as a result of the desired lubrication of the seal, fluid remains behind on the tank walls in the region above the ram plate.

The region above the ram plate is in connection with atmospheric oxygen and is heated. If there are no faults for a relatively long time, the tank wall is not cleaned off again by the seals. As a result, in the case of temperature-sensitive and perishable fluids, aging of the same occurs. The consequence is that layers can build up, which impair the function and, when they are next passed over by the ram plate, shed detached parts which get into the process, where they adversely influence the product properties.

The pressure build-up on the ram plate for keeping the admission pressure constant and improving the accuracy of the delivery of the discharge element (for example a rotary piston pump) is preferably applied by hydraulic or pneumatic constructions set up outside the storage tank. The force transmission takes place via a relatively sophisticated construction, comprising a yoke which is connected to the ram plate via rods.

The capacity of a storage tank described above is dependent on the tank volume. If a high storage capacity is required in the case of high total throughputs of the overall process, a very large tank volume is required. Suitable tanks have either a very large diameter or are very high. A great height has the effect that the pressure losses in the tank increase, in particular in the case of very highly viscous fluids, and require greater pressurization via the ram plate. A higher pressure in the tank requires a more cost-intensive design of the tank. Tanks with a large diameter, with which the pressure loss is smaller, and the roundness required for the action of the seals of the ram plate can likewise only be produced very cost-intensively. Furthermore, the guidance of the flow in tanks with a large diameter is very unfavorable, in particular at the inflow and outflow. Dead spaces through which flow does not pass are created, in particular in the outer region around the inflow and outflow. Tests have shown that, with diameter ratios of 1:2 (inflow: tank diameter), dead spaces form in spite of absolutely laminar flow and internal fittings in the tank that bring about a certain vortexed back-mixing (if it is possible to speak of vortices in relation to laminar flows).

The suction removal of the fluid from the tank by gear pumps that are preferably used presents problems, because high pressure losses are produced by low inflow cross sections to the suction side of the gear pump, in particular in the case of very highly viscous fluids. The inflow to the gear pump is therefore realized by high pressures, which are applied via the pneumatic or hydraulically driven ram plate. As already described, this in turn leads to the tank having to be designed for very high pressures.

Figure 4:
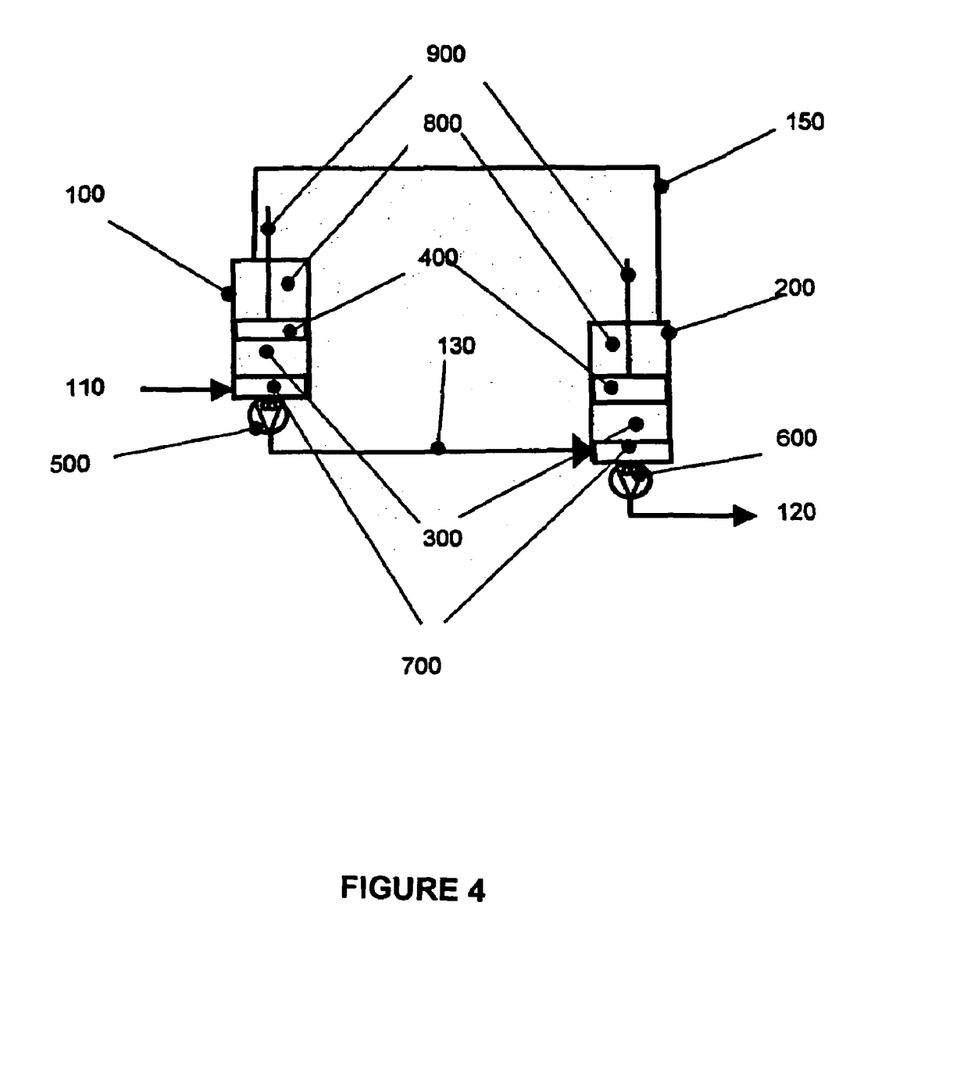

FIG. 4 shows an embodiment of the method according to the invention.

The method for eliminating the problems described of conventional storage systems for, in particular, temperature-sensitive highly viscous fluids comprises two storage tanks 100 and 200, which are connected in series. The exchange of the fluid contained in the storage tank volume 300 and the continuous cleaning off of the container walls is ensured by the continuous filling and emptying and the simultaneously moving-up and moving-down ram plate 400, which is provided with seals with respect to the tank wall.

The two storage tanks 100 and 200 are filled and emptied alternately. The tank volumes can be freely designed, depending on the requirements for the downtimes to be overcome of the fluid-delivering side and fluid-consuming side. In an outstanding embodiment of the method, these are designed to have the same volume. The storage tank 100 is fed by the fluid-delivering side of the process. The filling and emptying of the tanks 100 and 200 is controlled by means of the gear pump 500 by increasing and reducing the rotational speed. The pump 600 runs at a constant speed, as the total throughput of the process requires. The +/– difference of the setpoint speed of the pump 600 produces a controllable and defined filling time and emptying time. With the storage tanks at the same time being free from dead space, a defined residence time of the composition in the storage tanks is obtained.

Freedom from dead space means that, after the ram plate has been moved down, the ram plate rests flat on the tank base flange and, as a result, presses the fluid through the aperture in the base flange 700 formed as a truncated cone. As a result, it is ensured that the entire amount of fluid flows out of the storage tank to the gear pump. The feeding-in of the composition, in particular a highly viscous composition, takes place laterally via a flange into the truncated cone, which at the same time represents the base plate of the tank. The flange is centrally provided with a frustoconical, downwardly narrowing hole. At the end of the truncated cone, the gear pump is secured. The frustoconical form influences the flow of the fluid positively with regard to low pressure losses and dead spaces. The fluid is fed into the truncated cone laterally through the base flange via a bore. This has the advantage that the storage tank can be operated with the ram plate lowered even when faults do not occur on the fluid-delivering side of the process, and the truncated cone is flowed through continuously with fluid, and consequently the probability of aging of the fluid in this region is kept small. Furthermore, for better disassembly, the storage tank can be separated from the base flange by means of screw connections. Heating of the base flange, for example when processing hot-melt adhesives, is necessary and possible.

The two tanks are emptied by suitable gear pumps, preferably by the model Vacorex from the company Maag Pump Systems Textron GmbH. The manufacturer verifies the capability of discharging fluids from tanks with an absolute internal pressure of 0.1 bar. The pumps are distinguished by a very large inflow cross section and narrow production tolerances. Tests have shown that these gear pumps are capable of delivering, in particular, very highly viscous fluids of up to 50,000 Pas from a storage tank at an admission pressure of 2 bar.

The tanks according to the invention are suitable for the method.

The method is particularly advantageous in the case of tanks in which the pressure above the ram plate is produced by gas, the ram plate being provided with seals for sealing against the gas space 800. The ram plate is provided with one or more guide rods 900 through the tank cover, which prevent canting of the ram plate. Furthermore, supplying the heated ram plate with the heating medium or cooling medium is ensured by the guide rods.

The heating or cooling medium may take the form of thermal oil, water or any of the commonly used cooling and heating media. If only one heating system is necessary, a single electrical heating system is possible. The electrical connection is led through the guide rods. The guide rods are provided with suitable seals in the storage tank cover, which bring about outward sealing of the gas space and at the same time have a guiding property. Furthermore, the guide rod is used for electronically recording the filling level of the storage tank 10. The filling height is used for controlling the rotational speed of the gear pump F.

The ram plate is subjected to the pressure via a gas cushion; inert gas is preferably used here in the case of temperature-sensitive and perishable fluids. The gas is located in the free volume above the ram plate. The advantage of this construction is that there is a relatively large gas space, which reduces the inertia of the system with regard to the damping of pressure peaks, and at the same time there is neutralization of the space above the ram plate. The pressure of the gas is governed by the necessary admission pressure for the gear pump. The tank is closed by a suitable removable gas-sealed cover. In order that the gas pressure above the ram plate does not change during operation while the storage tank is being filled-or emptied, the gas spaces in the case of storage tanks of the same volume are connected to a suitable gas line 110. In this way, a constant predetermined pressure is ensured in both storage tanks. Gas losses, which take place for example as a result of diffusion through the seals, are equalized by a gas supply connected to the gas space via a pressure-relief valve which can be set. If the pressure in the storage tanks drops, the valve opens and the missing gas is filled up to the setpoint pressure set by the valve. As a safeguard against overpressure above, the design pressure, a pressure-relief valve can be installed to the gas space.

Example of the Method Sequence

Preconditions

A mass flow of 100 kg/h is delivered by the fluid-delivering side of the process 110. The fluid has a viscosity of 50,000 Pas and a density of 950 kg/m$^3$ at processing temperature.

The pump 600 constantly delivers 100 kg/h to the fluid-processing side of the process 120, which constantly consumes 100 kg/h.

The volume of each storage tank is 105 liters.

Basic Procedure

The starting point is that the storage tank 100 is completely filled and the storage tank 200 is completely empty.

For reasons of simplicity, in the following example an abrupt change in speed of the gear pump 500 is described. When the, speed changes, ramps are used. These ramps are of times in the range of seconds and only prolong the residence times to a negligible extent.

1st Step

At this instant, the speed of the gear pump 500 increases to 150 kg/h. The storage tank 100 consequently empties at 150 kg/h and is at the same time filled by the fluid-delivering side of the process 110 at 100 kg/h. The difference results in emptying at 50 kg/h. The storage tank 200 is filled at 150 kg/h and at the same time emptied by the constantly delivering gear pump 600 at 100 kg/h. The difference results in filling at 50 kg/h. The time required for the emptying of the storage tank 100 and filling of the storage tank 200 is altogether 2 h.

2nd Step

Once the storage tank 200 is completely filled, the pump 500 switches to a throughput of 50 kg/h and the storage tank 100 is filled with the difference from the fluid-delivering side of the process 110 of 100 kg/h at 50 kg/h. The storage tank 200 is emptied at 100 kg/h and filled 50 kg/h by pump 500, that, is to say altogether emptied at 50 kg. The time required for the emptying of the storage tank 200 and filling of the storage tank 100 is altogether 2 h.

In total, the fluid has an overall residence time in the storage tanks of 4 h.

The total storage volume with regard to failures caused by faults of the fluid-processing side of the process 120 and fluid-delivering side of the process 110 is 100 kg. As a result, failure times of one hour can be overcome.

Comparison with Conventional Storage Tanks

A conventional storage tank, which operates on the first-in-first-out principle and has the same storage volume of 105 liters (100 kg) in the direction of the fluid-processing side of the process and fluid-delivering side of the process, has a volume of 210 liters.

If the average residence time of the fluid in the storage tank is calculated, with 100 kg content and 100 kg/h, one hour is obtained. After this time, 75.7% of the fluid has left the tank. For the almost complete discharge of 99.8%, in the case of an intrinsically viscous fluid with an Ostwald/de-Waele exponent of 0.5, 10.2 times the average residence time is to be assumed —which corresponds to 10.2 hours, around 2.5 times as long as in the invented system described here.

According to requirements, the operating mode of the system may also be as follows:

The mode with completely filled tanks may be used if, for example, it is ensured that no faults or changes in throughput occur on the fluid-receiving side of the process, and/or if a temporary interruption is to be expected on the fluid-delivering side.

The mode with completely empty tanks may be used if, for example, it is ensured that no faults occur on the fluid-delivering side of the process, and/or if an interruption is to be expected on the fluid-receiving side.

The following advantages can be realized by the method according to the invention:
  continuous cleaning off of the tank walls
  large storage volume provided by two tanks
  control of the overall system by means of just one gear pump 500
  no heated hoselines necessary in the system
  pipework only with suitable steel lines
  pressure build-up on ram plate by gas space 800
  corresponding amount of gas and pipeline 150 between the tanks
  neutralization of the gas space 800
  guide rods for the energy supply to the ram plate and filling level measurement for controlling the pump 500
  settable pressure-relief valve to equalize gas losses
  use of the large-mouthed Vacorex gear pump under the tank
  disassemblable tanks allow the tanks to be cleaned
  feeding in of the fluids with little dead space via a special base flange 7
  connection of the two storage tanks by pipelines As fluids, temperature-sensitive and/or perishable fluids of up to 50,000 Pas may be processed, for example polymer melts such as SIS hot-melt, pressure-sensitive adhesives or acrylate-based or natural-rubber-based polymer solutions.

We claimed:

1. An apparatus for the equilibration of the throughput of-highly viscous fluids in closed pipeline systems, comprising a supply line, a tank having temperature-controlled inside walls, a plate which is displaceable in the tank and forms a seal against the walls of the tank, said supply line communicating with one or more openings through the plate and a discharge opening in the base of the tank, a discharge unit attached to said discharge opening, wherein the volume of said tank changes automatically as a result of the difference in the throughputs at the inflow and outflow and the resultant displacement of the plate and wherein the inner sides of the plate and of the base have a complementary conical, profile and the fluid is distributed within the plate by a star-shaped distributing channel to the outer edge of the plate in such a way that it leaves into the tank evenly over the entire periphery of the plate.

2. The apparatus as claimed in claim 1, wherein the tank is tubular, in particular with a circular cross section, and/or longitudinally profiled and/or double-walled.

3. The apparatus as claimed in claim 1 or 2, wherein the tank is lined on the inside with an anti-adhesive layer and/or an anti-corrosive layer.

4. The apparatus as claimed in claim 1 or 2, wherein the plate is designed such that the fluid is evenly distributed over the entire cross section of the tank.

5. The apparatus as claimed in claim 1 or 2, wherein the thermostatic control takes place electrically by heating conductors, or inductively, by thermal fluids and/or by steam.

6. The apparatus as claimed in claim 1 or 2, wherein the plate is pressed against the surface of the fluid by a force, which is independent of the position of the plate.

7. The apparatus as claimed in claim 6, wherein the force is generated by pneumatic cylinders, by hydraulic cylinders and/or by a weight.

8. The apparatus of claim 6 wherein said force is a constant force.

9. The apparatus as claimed in claim 1 or 2, wherein the tank volume is completely filled by the fluid.

10. The apparatus as claimed in claim 1 or 2, wherein the internal pressure of the apparatus at the inflow point is determined only by the weight of the plate and the parts of the installation exerting a load on the plate.

11. The apparatus as claimed in claim 1 or 2, wherein the degree of filling of the tank, and consequently the position of the plate, is independent of the internal pressure of the apparatus at the inflow point.

12. The apparatus as claimed in claim 1 or 2, wherein the discharge unit is an extruder, a pump, a gear pump, or a shut-off element.

* * * * *